United States Patent [19]

Durda et al.

[11] 4,280,911
[45] Jul. 28, 1981

[54] METHOD FOR TREATING WATER

[75] Inventors: Daniel J. Durda, Spring Park, Minn.; John T. Quigley, Madison, Wis.

[73] Assignee: Aeration Industries, Chaska, Minn.

[21] Appl. No.: 161,151

[22] Filed: Jun. 19, 1980

Related U.S. Application Data

[63] Continuation of Ser. No. 934,412, Aug. 17, 1978, abandoned.

[51] Int. Cl.$^3$ .................. C02F 3/02; C02F 1/74
[52] U.S. Cl. .................. 210/629; 210/747; 210/758; 261/87
[58] Field of Search .................. 210/3, 14, 15, 63 R, 210/194, 198 R, 199, 205, 221 M, 221 P, 242 A, 170, 620–629, 747, 758, 916, 98.1, 221.2, 221.3, 242.2; 261/87

[56] References Cited

U.S. PATENT DOCUMENTS

| | | | |
|---|---|---|---|
| 1,450,326 | 4/1923 | Maitland | 366/102 |
| 1,505,479 | 8/1924 | Maitland | 366/147 |
| 1,639,828 | 8/1927 | Wheeler et al. | 426/511 |
| 1,765,338 | 6/1930 | Jones et al. | 210/197 |
| 2,036,301 | 12/1936 | Durdin | 261/83 |
| 2,061,564 | 11/1936 | Drake et al. | 261/93 |
| 2,082,759 | 6/1937 | Walker | 210/8 |
| 2,116,023 | 5/1938 | Gwidt | 261/87 |
| 2,194,037 | 3/1940 | Thuma | 261/94 |
| 2,232,388 | 2/1941 | Ingalls et al. | 209/169 |
| 2,313,654 | 3/1943 | MacLean | 261/93 |
| 2,433,592 | 12/1947 | Booth | 261/93 |
| 2,515,538 | 7/1950 | Wall | 210/16 |
| 2,590,581 | 3/1952 | Shirley | 261/93 |
| 2,609,097 | 9/1952 | Dering | 209/169 |
| 2,641,455 | 6/1953 | Poirot | 261/29 |
| 2,730,493 | 1/1956 | Carlson | 204/108 |
| 2,928,665 | 3/1960 | Epprecht | 261/87 |
| 2,944,802 | 7/1960 | Daman | 261/87 |
| 3,053,390 | 9/1962 | Wood | 210/195 R |
| 3,092,678 | 6/1963 | Braun | 261/30 |
| 3,140,255 | 7/1964 | Daman | 209/169 |
| 3,278,170 | 10/1966 | Moritz | 261/29 |
| 3,465,706 | 9/1969 | Gwidt | 115/17 |
| 3,614,072 | 10/1971 | Brodie | 210/170 |
| 3,778,233 | 12/1973 | Blough et al. | 210/170 |
| 3,782,702 | 1/1974 | King | 261/87 |
| 3,975,469 | 8/1976 | Fuchs | 261/87 |
| 4,045,522 | 8/1977 | Nafziger | 261/93 |
| 4,070,279 | 1/1978 | Armstrong | 210/15 |

FOREIGN PATENT DOCUMENTS

| | | | |
|---|---|---|---|
| 1043481 | 11/1978 | Canada | 210/170 |
| 776656 | 10/1933 | France . | |
| 466143 | 5/1937 | United Kingdom . | |

OTHER PUBLICATIONS

Durda et al. "Design Criteria for Aeration in Waste Water Stabilization Ponds," Gwidt Aerator Inc. brochure.
"Cavitator" brochure.
"Rich AIRater" brochure.

*Primary Examiner*—Peter A. Hruskoci
*Attorney, Agent, or Firm*—James A. Niegowski

[57] ABSTRACT

A method for treating water is disclosed. The method is applicable for the treatment of waste water within lagoons and ponds wherein the treatment of the waste water is accomplished mainly through aeration. The method comprises steps of: aerating a bounded body of water with a plurality of propeller-type aerators, each aerator having a hollow tube with opposite ends, a longitudinal axis extending between the ends, and a propeller adjacent one of the ends; placing each of the aerators in the bounded body of water with the propeller and tube end adjacent thereto below the top surface of the water and with the longitudinal axis of each aerator disposed at an angle below the horizontal; driving the aerators to create individual circulating flow patterns around each of the aerators; mixing the water by arranging the aerators in a disposition to link the individual flow patterns created by adjacent aerators to one another to form a larger closed overall flow pattern; injecting oxygen from ambient air through the tube into the body of water adjacent the propeller at a rate greater than one pound of oxygen per horsepower/hour; and inducing by means of the propellers of the aerators the closed overall flow pattern at an average linear velocity in a generally horizontal direction through a cross section to flow at the rate of at least 0.25 feet per second.

16 Claims, 9 Drawing Figures

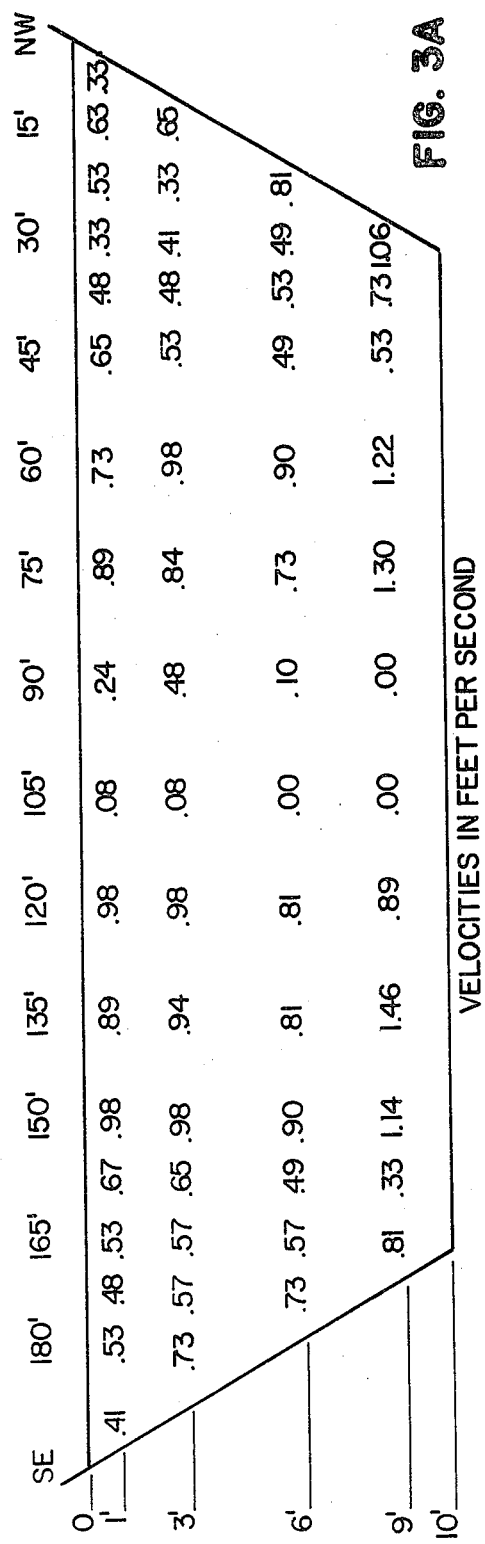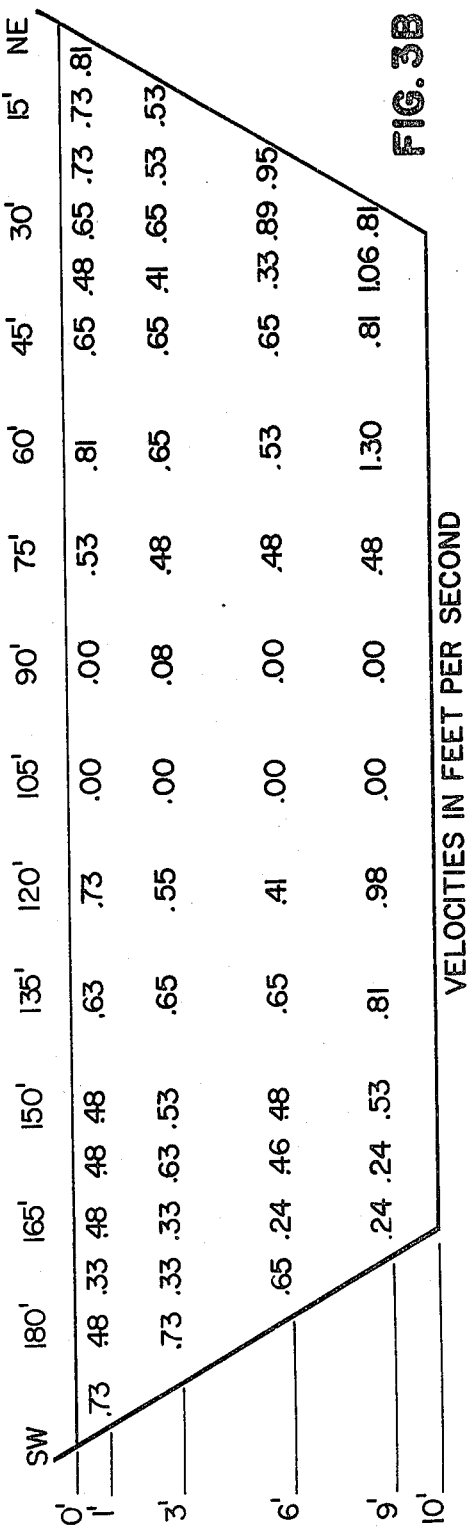

METHOD FOR TREATING WATER

This is a continuation of application Ser. No. 934,412, filed Aug. 17, 1978, now abandoned.

BACKGROUND OF THE INVENTION

The invention relates broadly to the treatment of water by aeration. The aeration treatment of water has been used to treat waste water within lagoons and to upgrade the quality of natural bodies of water, such as lakes.

In the majority of prior design criteria evaluations for aerated lagoons, focus has been placed almost entirely on the satisfaction of waste biochemical oxygen demand (BOD). That is, the amount of supplemental aeration or oxygen which was to be supplied to a lagoon was calculated by the amount which the waste strength exceeded the oxygen available from photosyntheses and atmospheric aeration. The mixing of the waste water to maintain solids in suspension while aerating the body of water was ignored until recently. In an article entitled "How to Design Aerated Lagoon Systems to Meet 1977 Effluent Standards-Soluble Substrate Removal Relationships" by Sam C. White and Linvil G. Rich at pages 82–83 of Water and Sewage Works, April 1976, mixing was included as a design parameter for an aerated lagoon.

Waste water treatment aeration systems generally utilize either diffused air aerators or mechanical aerators. A diffused air type aerator introduces air or pure oxygen into water via submerged forced diffusers or nozzles. Mechanical type aerators generally agitate the water so as to promote solution of air from the atmosphere into the water. These conventional aerators are designed primarily from the standpoint of introducing a certain amount of oxygen into the water being treated. The mixing of the water and the introduced oxygen has not been a design criteria and, hence, conventional prior aerator systems have inefficient mixing capabilities. For example, in a one acre aerated pond for treating domestic waste water, a pond which has a depth of ten feet and a 3:1 side wall slope and a volume of 432,000 cubic feet, conventional aerator sizing procedures would require approximately 200–400 horsepower of surface area capacity or over 1,000 horsepower for a diffused air system. Such high power systems result in the oxygen requirement of the pond being satisfied fourfold, while probably not causing a complete mixing of the pond so as to assure scouring velocities of 0.5 feet per second throughout the pond.

Mechanical surface aerators also exhibit an additional problem in that they have separate and generally conflicting mixing vectors. That is, the force vectors from the aerators cannot generally be managed or manipulated and, hence, with closely spaced aerators, mixing vectors tend to cancel out.

Another problem with most conventional aerator systems is that their oxygen transfer is effectively limited by their inability to properly mix the waste. Most conventional aerator systems tend to have a very limited core of influence, that is, the conventional aerators cause a high dissolved oxygen concentration close to the units themselves because of the inability of the units to mix. Thus, such conventional systems tend to create a condition of oxygen oversaturation instead of under saturation, which would promote oxygen transfer. Many conventional aerators are tested in small tanks and the test measured oxygen transfer rate at zero DO is then reported as a standard for comparision. This standard, however, is not accurate in field applications since in field applications, the dissolved oxygen is required in a much larger volume. In field installations, the conventional units tend to overaerate the nearby region and, thereby, to effectively work against themselves. The dissolved oxygen is not effectively reaching outlying regions.

Other problems also arise due to the failure of the prior art aeration systems to adequately mix the waste water being treated. Without adequate mixing, for example, when 0.5 fps horizontal velocity is not attained, aerated lagoons may develop adverse conditions that effect performance such as hydraulic short circuiting and/or sludge solids build-up. As waste water enters an unmixed lagoon, a certain fraction of waste may move directly to the outlet without adequate time of interaction with other lagoon contents for adequate treatment. If the pond is completely stagnate, influent velocity effects or momentum may set up such a "short circuit" current and this problem may be exasperated by thermal stratification effects. Another problem is a sludge blanket build-up. Under mixed lagoons, cells may develop aerobic-anaerobic regions analogous to a facultative pond. Anaerobic sludge deposits found in undermixed lagoons may produce noxious odors such as $H_2S$ and/or $NH_3$ gases.

These gases may carry a high concentration of oxidizable organic material (i.e., BOD) into the water. Finally, the release of these gases together with the $CH_4$ and $N_2$ may contribute to floating solids and a tendency to "belch" these into the lagoon or cell outlet. This mass of material may be transported into subsequent treatment cells or out as a final effluent.

Sludge deposits deposited in a lagoon must be regarded as lost from control. Anaerobic digestion may occur when temperatures permit, with the result that performance may become seasonal. The system is effectively out of operational control, when effluent suspended solids in BOD concentrations become a function of such factors. Such a system cannot reliably assure the degree of performance needed to meet the ordered quality standards of today.

The method in accordance with the present invention overcomes the above deficiencies of conventional systems by both aerating a body of water and causing mixing of the aerated water at efficient power levels.

SUMMARY OF THE INVENTION

The present invention relates to a method for treating water. The method comprises the steps of:

aerating a bounded body of water with a plurality of propeller-type aerators, each aerator having a hollow tube with opposite ends, a longitudinal axis extending between the ends, and a propeller adjacent one of the ends;

placing each of the aerators in the bounded body of water with the propeller and tube end adjacent thereto below the top surface of the water and with the longitudinal axis of each aerator disposed at an angle below the horizontal;

driving the aerators to create individual circulating flow patterns around each of the aerators;

mixing the water by arranging the aerators in a disposition to link the individual flow patterns created by adjacent aerators to one another to form a larger closed overall flow pattern;

injecting oxygen from ambient air through the tube into the body of water adjacent the propeller at a rate greater than 1 pound of oxygen per horsepower-hour;

inducing by means of the propellers of the aerators the closed overall flow pattern at an average linear velocity in a generally horizontal direction through a cross section to flow at a rate of at least 0.25 feet per second.

In the preferred embodiment, the method of the present invention includes the steps of injecting oxygen at a rate greater than 2.0 pounds of oxygen per horsepower-hour; and of inducing the closed overall flow pattern at a linear velocity greater than 0.5 feet per second by driving the propellers of the aerators in the bounded body of water at less than 0.1 horsepower per thousand cubic feet of water in the bounded body of water. The injection of the oxygen and the inducement of the flow pattern at the above low horsepower rates results in efficient treatment of waste water and an efficient reduction of effluent is biological oxygen demand (BOD). It is believed that the efficient treatment of waste water is due to the capability of both inducing the flow pattern to maintain solids in suspension and the injection of oxygen both at efficient power ratings.

The overall flow pattern within a bounded body of water is attained by linking the circulating flow patterns of adjacent aerators together. In one embodiment, a single series or set of aerators is arranged in a single closed overall path. In another embodiment a second set of aerators is arranged adjacent to the first set to create a second closed flow pattern within the body of water. In another embodiment, a second set of aerators forms a closed flow pattern within the closed flow pattern formed by a first set of aerators.

In order to prevent void flow areas within the center of an overall flow pattern, one or more aerators can be displaced out of the overall flow pattern toward the center of the overall flow pattern. This displacement of one or more aerators creates a sub-flow pattern to avoid a void flow area.

By injecting oxygen at a controlled rate and by simultaneously controlling the flow and flow patterns of the waste water, a controlled and efficient waste water treatment system can be maintained. The suspended solids levels in various lagoons and effluent may be manipulated with proper control of the mixing lagoon by lagoon through a series system. Actually, any form of seasonal control discharge can be provided for suitable solids while maintaining a flow-through condition for the liquid. In order to implement this strategy with aerator and turbulence (mixing) control, aeration is tapered down during the winter as temperatures fall. This is appropriate since less oxygen is required as the rate of exertion of oxygen demand declines with temperature and oxygen transfer efficiency is improved with increasing saturation values for dissolved oxygen.

An additional benefit of this procedure is that solids are allowed preferentially to drop from suspension and the lagoon provides essentially for solids' storage and holding during winter operations. Solids then accumulate as a thin aerobic sludge blanket for slow digestion through winter. As noted above, a reduced level of aeration may be provided during winter to assure that the lagoon surface remains at least partially open to the atmosphere or, at least, that aerobic conditions prevail throughout the water volume. Thin sludge layers held for an extended period under aerobic condition may be expected to undergo composting and to waste away.

When the lagoon begins to form again, aeration and turbulence levels may be restored early and gradually to resuspend solids and to increase treatment while providing for a flow proportioned discharge of solids as runoff occurs and stream levels are high. Thus, by utilizing the present method, a year round controlled system of waste water treatment can be attained at efficient power levels.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

FIG. 3a is a diagram illustrating velocity measurements taken at various locations within the body of water illustrated in FIG. 2a;

FIG. 3b is a diagram illustrating velocity measurements taken at various locations within the body of water illustrated in FIG. 2b;

DETAILED DESCRIPTION OF THE INVENTION

Figure 1:
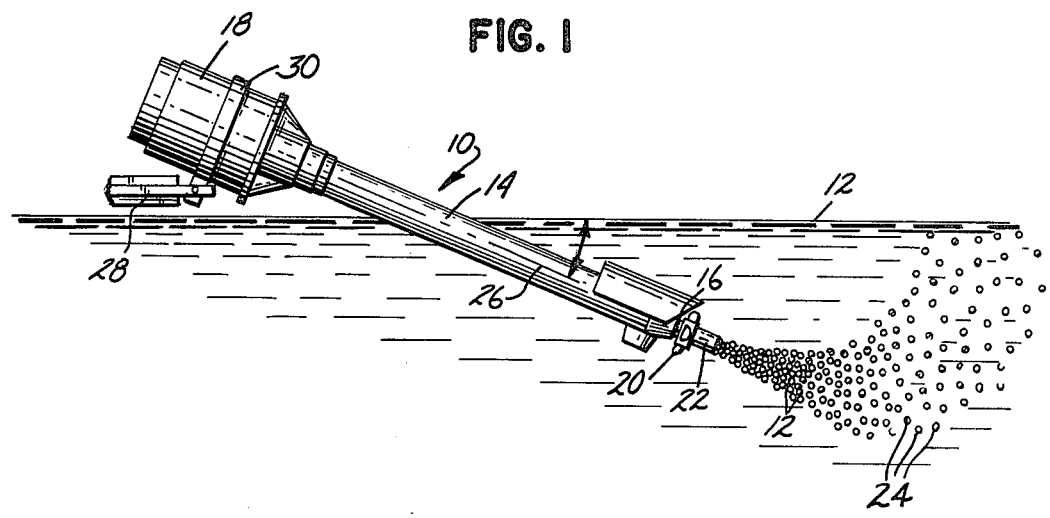
FIG. 1 is a side elevational view illustrating a single propeller-type aerator for use in the method of the present invention.

Referring to the drawings, there is shown in FIG. 1 a propeller-type aerator 10 for use in the method of the present invention. The aerator 10 is shown disposed within a liquid 12, preferably water or waste water. The aerator 10 has an outer tubular housing 14 and an inner tube 16 rotatably carried within the outer tubular housing 14. The inner tube 16 extends within the tubular housing 14 to a level above the top surface of the liquid 12 and is drivingly coupled to a motor carried within a motor housing 18. The inner tube 16 has at least one hole at its upper end above the top level of the liquid 12 for admitting air into the interior of the tube 16. The inner tube 16 extends outwardly beyond the lower end of the tubular housing 14 and has a propeller 20 fixedly attached thereto. A diffusion tube 22 is also attached to the inner tube 16 and has a hollow interior which communicates with the hollow interior of the inner tube 16.

When the inner tube 16 is rotated by the motor, the propeller 20 is also rotated. As the propeller 20 rotates, it causes a directional, turbulent flow field in the liquid 12. The reduced pressure zone created by this flow downstream of the propeller aspirates or draws air down the hollow tube 16 and causes air to enter the liquid through an open end of the diffusion tube 22 as air bubbles 24. The air bubbles 24 are thereafter dispersed by the turbulence caused by the propeller. In this manner, the propeller-type aerator 10 aerates while it mixes. As will be explained more fully hereinafter, aerators 10 can be arranged to provide a directional flow with the aerators 10 installed to contribute additively to the uniform mixing patterns involving an entire bounded body of water. Liquid flow can thus be directed and circulation patterns can be developed to assure desired velocity vectors throughout an entire volume of a body of water being treated.

The inner tube 16 has a longitudinal axis indicated by line 26. The aerator 10 is supported in the liquid 12 by a platform or boom 28. The aerator 10 is attached to the platform 28 in any conventional manner, such as by a bracket 30. The aerator 10 is supported in the liquid 12 such that the longitudinal axis 26 forms an angle with the horizontal between 15 and 25 degrees. Preferably the angle is set at 22 degrees. In this manner, the mixing energy caused by the rotating propeller tends to promote circulation and flow over a larger area than is typical of conventional turbine aerators. If the angle is increased past 25 degrees so that the tube 14 becomes more vertical, to some degree higher oxygen transfer is obtained at the expense of mixing. As the angle is decreased below 15 degrees toward the horizontal, mixing is increased at the expense of oxygen transfer. It has been found that the range of 15 to 25 degrees for the angle of inclination is an optimum compromise of mixing and aeration and that the 22 degree angle of inclination is preferable.

The method of the present invention finds its primary use in aerated lagoons or ponds used as a portion of an overall waste water treatment process. Aerated lagoons systems can be designed for three different levels of mixing. Levels of mixing are generally determined by the degree of pollution in the water or the BOD requirement. For most waste water treatment lagoons receiving relatively dilute domestic wastes, the power required to satisfy oxygen demand through most of the year is markedly less than required to maintain solids in suspension. The lowest level of power input must transfer sufficient oxygen to satisfy demand exerted by the satisfaction of BOD in the waste. Aeration sufficient to transfer 0.7 to 1.4 pounds of oxygen per pound BOD exerted is typical. An intermediate level of power input must provide for uniform oxygen dispersion throughout a lagoon volume in addition to merely supplying a specified quantity of oxygen. Hence, additional power over that required to merely inject the oxygen is needed so that minimal circulation effects are created to ensure uniform distribution of oxygen throughout a lagoon volume. However, at such an intermediate level, sufficient turbulence is not created to maintain solids in suspension. The highest level of power input that would reasonably be necessary would provide for oxygen dispersion as well as minimum scouring velocities, such as 0.4 to 0.5 feet per second (fps). Prior art aeration systems have required at least 0.5 hp/$1000^3$ of water and higher power densities to attain such flow velocities.

The method of the present invention accomplishes both adequate oxygen injection into waste water and mixing of the aerated waste water at efficient power levels. The present invention permits management or control of oxygen injection and mixing velocities at efficient power levels under numerous water pollution conditions. The method includes the steps of providing a plurality of propeller-type aerators where each aerator has a hollow tube with opposite ends and a longitudinal axis extending between the ends and a propeller adjacent one of the ends. The aerator 10 is specially suited for the present method. The aerators are placed in a bounded body of water, such as a pond or a lagoon, with the propeller and tube end adjacent thereto below the top surface of the water and with a longitudinal axis of each aerator disposed at an angle below the horizontal. The water is mixed by arranging and driving the aerators in a disposition so that individual circulating flow patterns are created around each of the aerators and the individual flow patterns link to one another to form a larger closed overall flow pattern. That is, the aerators are arranged such that when the propellers of the aerators are driven at sufficiently high speeds to inject ambient air into the water, individual flow patterns are created around each of the aerators and are linked together to form a larger closed overall flow pattern.

Figure 4:
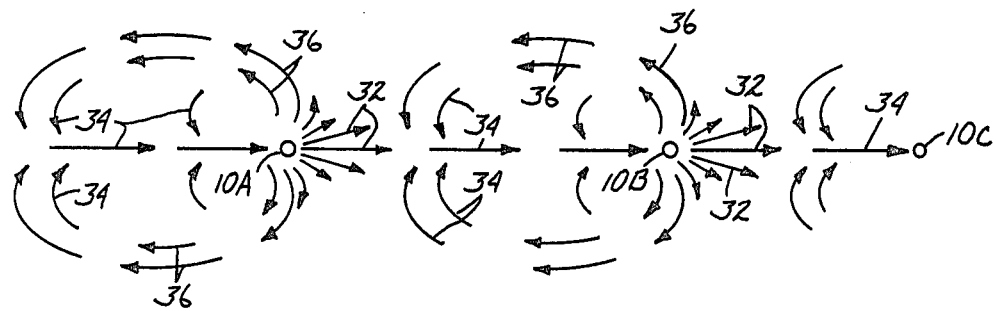
FIG. 4 is a diagrammatic plan view illustrating individual horizontal circulating flow patterns induced by propeller-type aerators and the linking of adjacent circulating flow patterns in accordance with the method of the present invention.

The individual flow patterns and the linking of adjacent individual flow patterns is illustrated in FIG. 4. Three aerators 10a, 10b, 10c are illustrated diagrammatically in FIG. 4. Horizontal flow vectors indicating a horizontal flow of the water are shown emanating about each of the aerators 10a, 10b, and 10c. A plurality of forward horizontal flow vectors 32 indicate a horizontal flow of fluid forward of the propeller of aerator 10a. Negative horizontal flow of vectors 34 indicate a horizontal flow of fluid which is drawn toward the propeller of operator 10a from the area rearward of the propeller. Horizontal flow vectors 36 indicate a diffuse horizontal flow of fluid bending backward from the forward flow indicated by vectors 32 and interconnecting or forming a portion of the flow indicated by negative vectors 34. Similarly numbered flow vectors are indicated about aerators 10b and 10c. As seen in FIG. 4 the aerators 10a, 10b, and 10c are arranged relative to one another so that at least some of the flow indicated by the negative flow vectors 34 of one of the aerators links with at least some of the forward flow vectors 32 of an adjacent aerator. In this manner, an overall horizontal flow is created in the general direction of the forward flow vectors 32.

Figure 2A:
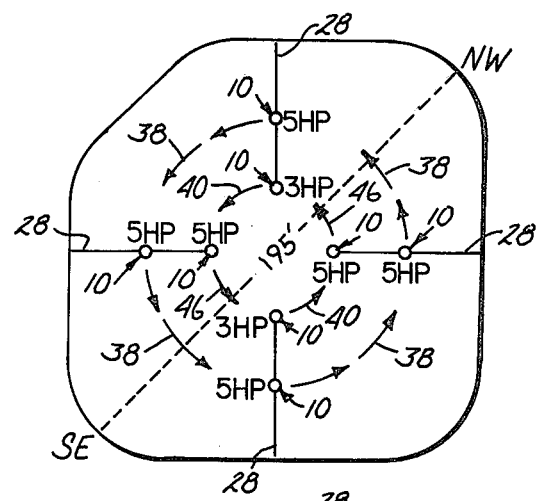
FIG. 2a is a plan view diagrammatically illustrating the specific placement of a number of propeller-type aerators within a bounded body of water and the overall flow path induced by the aerators.
Figure 2B:
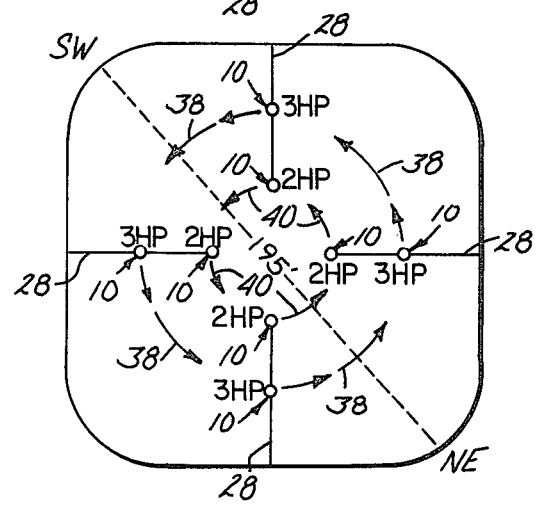
FIG. 2b is a plan view similar to FIG. 2a illustrating the specific placement of propeller-type aerators within a different bounded body of water.

FIGS. 2a and 2b illustrate a plurality of propeller-type aerators 10 supported on platforms or booms 28 within a pair of waste water treatment lagoons in which studies of the present invention were made. Flow vectors or arrows 40, 38 indicate a closed overall horizontal flow pattern or path of the waste water. The outer set or circle of aerators 10 creates the overall flow pattern indicated by vectors 38. The overall flow pattern indicated by vectors 40 is created by an inner set or circle of aerators 10. The overall flow pattern indicated by vectors 40 circulates within the overall flow pattern indicated by vectors 38.

FIGS. 2a and 2b diagrammatically represent a plan view of two lagoons or ponds that form a portion of a waste water treatment plant within which the present method was utilized. The water treatment plant also included a primary sedimentation unit, a roughing filter and a clarifier followed by a pond or lagoon system having four ponds, which FIGS. 2a and 2b, respectively, illustrate first and second ponds of the pond system. Each of these first two ponds has a surface area of approximately ¾ of an acre and a water volume of approximately 275,000 cubic feet. The ponds are approximately 175 ft. wide and 190 ft. long.

The pond of FIG. 2a has a plurality of propeller-type aerators 10 installed with a total power of 36 hp. The pond represented by FIG. 2b has a plurality of aerators 10 installed with a combined power of 20 hp. The booms 28 extend inwardly from approximately the middle of each side of each pond. Each of the outer aerators is disposed approximately 30 ft. from a respective side wall and each of the inner aerators is disposed approximately 60 ft. from a respective side wall.

FIG. 3a illustrates a profile or vertical section through the pond illustrated in FIG. 2a along the 195 ft. line passing between SE and NW. FIG. 3b illustrates a similar profile or vertical section along 195 ft. line passing SW to NE in the pond illustrated in FIG. 2b. FIGS. 3a and 3b specify the velocity measurements in feet per second (fps) taken at various depths within the ponds, along the cross section, when the aerators 10 were operating to create the overall flow patterns indicated by arrows 38,40. The measured velocities in FIG. 3a result in average linear velocity in a generally horizontal direction through the cross section of the first pond of 0.77 fps and the velocities measured in FIG. 3b result in average linear velocity in a generally horizontal direction through a cross section of the second pond of 0.58 fps. These calculated average pond velocities are also the average velocity of the closed overall flow pattern in the ponds. Since a total of 36 hp is used in the first pond and the first pond has a volume of approximately 275,000 cubic feet, the average pond velocity of 0.77 fps is attained, utilizing 0.13 hp per 1000 cubic ft. of water. The second pond also has an approximate volume of 275,000 cubic feet and, hence, an average pond velocity in the second pond of 0.58 fps is attained, utilizing 0.07 hp per 1000 cubic feet of water. The 20 hp utilized in the second pond attained a velocity sufficient to maintain solids in a complete suspension.

When a 5 horsepower propeller-type aerator is used and the aerator is disposed approximately 22 degrees below the horizontal, a horizontal flow sufficient to maintain solids in suspension extends forwardly at least 60 feet and a diffuse flow field approximately 60 feet wide is formed. When a 2 horsepower propeller-type aerator is used and is disposed at an angle approximately 22 degrees below the horizontal, a horizontal forward flow field sufficient to maintain solids in suspension extends forwardly at least 30 feet and a diffuse flow field has a width between approximately 30 and 40 feet.

It is generally recognized, an average pond velocity of 0.50 fps should be sufficient to maintain solids in suspension within a waste water treatment facility. The higher power used within the first pond was utilized because of increased BOD loading to the pond system. As mentioned above, the average pond velocities attained in the ponds illustrated in FIGS. 2a and 2b maintained solids totally in suspension. It is also within the contemplation of the present invention to utilize lower flow velocities wherein solids may be only partially suspended. However, the present invention contemplates an average pond velocity of greater than 0.25 fps for the purpose of mixing the waste water. In the preferred embodiment, an average pond velocity of greater than 0.5 fps is used. An average pond velocity of greater than 0.5 fps should be sufficient to maintain solids in complete suspension.

In the ponds illustrated by FIGS. 2a and 2b, oxygen was injected at a rate greater than 2.0 pounds of oxygen per horsepower. The method of the present invention contemplates injecting oxygen at a rate of at least 1 pound of oxygen per horsepower hour and preferably at a rate greater than 2 pounds of oxygen per horsepower hour. In the present method, utilizing propeller-type aerators as illustrated in FIG. 1, oxygen injection rates exceeding 3 pounds of oxygen per horsepower hour can be obtained.

While some conventional aerators claim a capability of injecting oxygen at the above rate, applicants are unaware of any aeration system which can combine both the oxygen injection and inducement of flow velocity in accordance with the method of the present invention.

Figure 5:
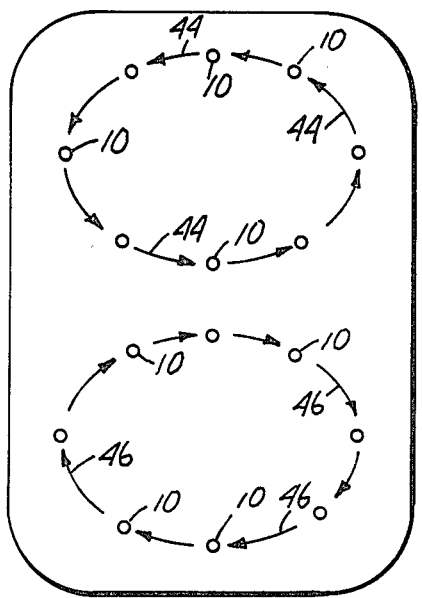
FIG. 5 is a diagrammatic plan view illustrating another arrangement of propeller-type aerators and the resulting adjacent overall flow paths.

FIGS. 2a and 2b illustrate one form of an overall flow pattern in accordance with the method of the present invention. The overall flow pattern illustrated in FIGS. 2a and 2b includes a closed overall flow pattern, illustrated by vectors 40, which flows within a closed overall flow pattern indicated by vectors 38. FIG. 5 illustrates an alternate overall flow pattern of water wherein two sets of aerators 10 are utilized to form a pair of closed overall flow patterns or paths side-by-side or adjacent to one another. The adjacent closed overall flow paths are indicated by horizontal flow vectors 44, 46.

Figure 6:
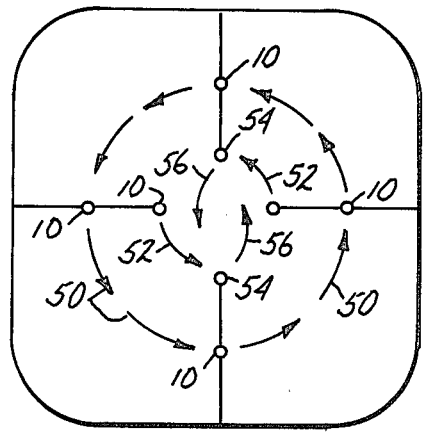
FIG. 6 is a diagrammatic plan view illustrating an arrangement of propeller-type aerators in encircling overall paths wherein a subflow path is created by displacing a number of aerators out of the overall flow path.

FIG. 6 illustrates an overall flow pattern system similar to that illustrated in FIGS. 2a and 2b wherein an outer closed overall flow path is indicated by horizontal flow vectors 50. An inner closed overall flow path is indicated by horizontal flow vectors 52. The outer flow indicated by vectors 50 is created by an outer set of aerators 10 and the inner flow path is created by two aerators 10. One or more aerators, two are shown in FIG. 6 and are designated by the number 54, are displaced out of alignment with the inner flow path toward the center thereof. The aerators 54 which are disposed out of the closed overall flow path are orientated towards the center of the flow path for the purpose of creating a subflow path of water to prevent the formation of void flow areas in the center of the pond. The subflow path is indicated by horizontal flow vectors 56.

Figure 7:
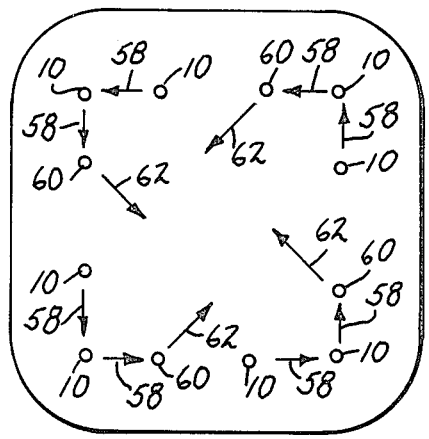
FIG. 7 is a diagrammatic plan view illustrating the placement of a plurality of propeller-type aerators in a single overall flow path wherein a number of aerators are displaced from alignment with the overall flow path to create a subflow path.

FIG. 7 illustrates a variation of aerator orientation similar to FIG. 6 wherein only a single set of aerators 10 is utilized to form a closed overall flow path, indicated by horizontal flow vectors 58. A number of aerators, designated by the number 60, in FIG. 7 are disposed out of alignment with the closed overall flow to form a subflow path, indicated by horizontal flow vectors 62, for the purpose of preventing the formation of a void flow path in the center of the pond. While four aerators 60 are shown disposed out of alignment, it should be understood that any number of aerators may be so disposed.

Numerous characteristics and advantages of our invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A method of treating a bounded body of water with a propeller type aerator comprising the steps of:
   (a) aerating a bounded body of water with a plurality of propeller type aerators, each aerator having a hollow tube with opposite ends, a longitudinal axis extending between the ends and a propeller adjacent one of the ends;
   (b) placing each of said aerators in the bounded body of water with said propeller and tube end adjacent thereto below the top surface of said water and with the longitudinal axis of each aerator disposed at an angle below horizontal;
   (c) driving the aerators to create individual flow patterns around each of the aerators;
   (d) mixing the water by arranging the aerators in a disposition to link the individual flow patterns created by adjacent aerators to one another to form a larger closed overall flow pattern;
   (e) injecting oxygen through said tube into the body of water adjacent said propeller at a rate greater than 1 pound of oxygen per horse power-hour; and
   (f) inducing by rotating the propellers of said aerators said closed overall flow pattern at an average linear velocity in a generally horizontal direction through a cross section to flow at least 0.25 feet per second, said angle of inclination of each aerator being sufficient to accomplish the injection rate of step (e) and the average linear velocity of step (f).

2. A method in accordance with claim 1 wherein step (e) includes injecting oxygen at a rate greater than 2.0 lbs. of oxygen per horsepower-hour and step (f) includes inducing said closed overall flow pattern at a linear velocity greater than 0.5 feet per second.

3. A method in accordance with claim 1 or 2 wherein step (f) includes inducing said closed overall flow pattern by driving the propellers of said aerators in the bounded body of water at less than 0.5 horsepower per 1,000 cubic feet of water in said bounded body of water.

4. A method in accordance with claim 3 wherein step (f) includes inducing said closed overall flow pattern by driving the propeller of said aerator in the bounded body of water at less than 0.1 horsepower per 1,000 cubic feet of water in said bounded body of water.

5. A method in accordance with claim 1 or 2 wherein step (f) includes maintaining said linear velocity to a depth of at least ten feet in said body of water.

6. A method in accordance with claim 1 or 2 wherein step (b) includes placing each aerator with said longitudinal axis at an angle between 12 degrees and 25 degrees with respect to the horizontal.

7. A method in accordance with claim 6 wherein said angle is set at substantially 22 degrees with respect to the horizontal.

8. A method in accordance with claim 1 wherein step (d) includes arranging said plurality of aerators to form a plurality of said larger closed overall flow patterns.

9. A method of treating a bounded body of water with a propeller type aerator comprising the steps of:
   (a) aerating a bounded body of water with a plurality of propeller type aerators, each aerator having a hollow tube with opposite ends, a longitudinal axis extending between the ends and a propeller adjacent one of said ends, said propeller being rotatably driven and said end of the tube adjacent the propeller including means for injecting air into the water;
   (b) placing each of said aerators into a bounded body of water with said propeller and tube end adjacent thereto below the top surface of said water and with the longitudinal axis of each aerator disposed at an angle below the horizontal;
   (c) arranging and driving a first of said aerators to induce a first fluid flow path about said first aerator, said first fluid flow path having forward horizontal flow vectors in a direction forward of the propeller of said first aerator, negative horizontal flow vectors in a direction toward the propeller of said first aerator from an area rearward of said last-mentioned propeller, and a diffuse horizontal flow field interconnecting the forward and negative flow vectors;
   (d) arranging and driving a second of said aerators to induce a second fluid flow path about said second aerator, said second fluid flow path having forward horizontal flow vectors in a direction forward of the propeller of said second aerator, negative horizontal flow vectors in a direction toward the propeller of said second aerator from an area rearward of said last-mentioned propeller, and a diffuse horizontal flow field interconnecting the forward and negative flow vectors of said second fluid flow path;
   (e) disposing said first aerator relative to said second aerator so that at least some of the negative flow vectors of said second aerator link with at least some of the forward flow vectors of said first aerator to create an overall flow path in the general direction of the forward flow vectors of said first and second aerators;
   (f) injecting oxygen from the ambient air through the tubes of said aerators into the body of water at a rate greater than 1 pound of oxygen per horsepower-hour; and
   (g) inducing by means of the propellers of said aerators the overall flow path of the water having an average linear velocity through a cross-section to flow at least 0.25 feet per second, said angle of inclination of each aerator being sufficient to accomplish the injection rate of step (f) and the average linear velocity of step (g).

10. A method in accordance with claim 9 wherein step (f) includes injecting oxygen at a rate greater than 2.5 pounds of oxygen per horsepower-hour, and step (c) includes inducing said overall flow path of water at a linear velocity greater than 0.5 feet per second.

11. A method in accordance with claim 10 wherein step (g) includes inducing said overall flow path of water by driving the propellers of said plurality of aerators in the body of water at less than 0.5 horsepower per 1,000 cubic feet of water in said body of water.

12. A method in accordance with claim 9 including the steps of:
   (h) arranging and driving a series of additional aerators to induce a fluid flow path about each additional aerator, each of said last-mentioned fluid flow paths having forward horizontal flow vectors in a direction forward of the propeller of an associated aerator, negative horizontal flow vectors in a direction toward the propeller of said associated aerator from an area rearward of said last-mentioned propeller, and a diffuse horizontal flow field interconnecting the last-mentioned forward and negative flow vectors; and (i) disposing said series of additional aerators and said first and second aerators to create a closed overall flow path by linking some of the negative and forward flow vectors of successively disposed aerators.

13. A method in accordance with claim 12 including the steps of:

(j) providing at least a second set of a plurality of propeller type aerators; and (k) performing steps (a), (b), (c), (d), (e), (h) and (i) with said second set of aerators to create at least a second closed overall flow path in the bounded body of water adjacent to and separate from the first closed overall flow path.

14. A method in accordance with claim 12 including the steps of:

(1) providing an additional set of a plurality of propeller type aerators;

(m) performing steps (a), (b), (c), (d), (e), (h) and (i) with said additional set of aerators to create an additional closed overall path within the first closed overall flow path.

15. A method in accordance with claim 14 including the step of:

(n) displacing at least one of the aerators of said additional set out of alignment with the additional closed overall flow path toward the center of the additional closed overall flow path to create a subflow path for reducing the tendency of formation of a void flow area in the center of said additional closed overall flow path.

16. A method in accordance with claim 12 including the step of: (o) displacing at least one of the aerators of the series of aerators out of alignment with the closed overall flow path toward the center of the closed overall flow path to create a subflow path for reducing the tendency of formation of a void flow area in the center of said closed overall flow path.

* * * * *